United States Patent [19]
Hasegawa et al.

[11] Patent Number: 5,253,077
[45] Date of Patent: Oct. 12, 1993

[54] METHOD OF CONTROLLING DIGITAL COPYING MACHINE

[75] Inventors: Ken Hasegawa; Hiroshi Takayanagi, both of Kanagawa, Japan

[73] Assignee: Fuji Xerox Co., Ltd., Tokyo, Japan

[21] Appl. No.: 595,805

[22] Filed: Oct. 10, 1990

[51] Int. Cl.⁵ .............................................. H04N 1/10
[52] U.S. Cl. .................................... 358/404; 358/401; 358/444
[58] Field of Search ............... 358/401, 404, 434, 443, 358/444, 471, 474, 486, 498; 355/308, 309, 314, 318–320

[56] References Cited

U.S. PATENT DOCUMENTS

| 4,622,594 | 11/1986 | Honjo et al. | 358/498 |
| 4,866,536 | 9/1989 | Honjo et al. | 358/486 |
| 4,887,165 | 12/1989 | Sato et al. | 358/474 |

FOREIGN PATENT DOCUMENTS

| 57-173255A | 10/1982 | Japan | 358/404 |
| 59-16462 | 1/1984 | Japan | 358/474 |
| 59-41964A | 3/1984 | Japan | 358/404 |
| 59-122170A | 7/1984 | Japan | 358/404 |
| 60-183874A | 9/1985 | Japan | 358/404 |

Primary Examiner—Edward L. Coles, Sr.
Assistant Examiner—Jerome Grant, II
Attorney, Agent, or Firm—Finnegan, Henderson, Farabow, Garrett & Dunner

[57] ABSTRACT

Contents of a copy job including a kind of a document and a number of copy sets are specified from a user interface to set a copy job, and based on such contents a total data amount of the copy job is calculated by a CPU. Further, an available memory amount of the storing unit is detected. If the total amount of the copy job is larger than the available memory amount, the document reading operation by an image input unit is suspended. The document reading operation is resumed when the available memory amount becomes larger than the total data amount.

16 Claims, 12 Drawing Sheets

FIG. 5
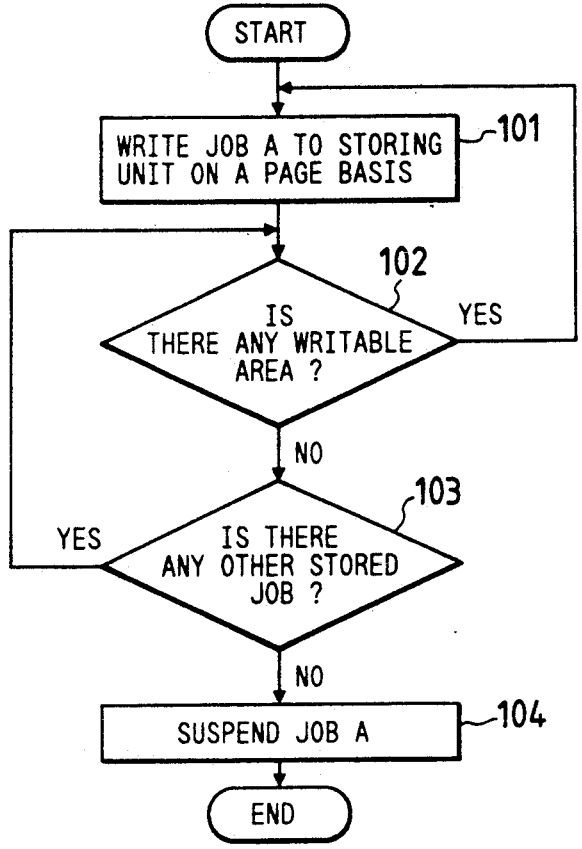
FIG. 6
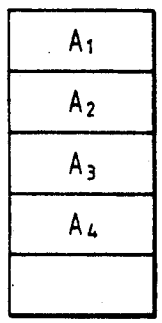 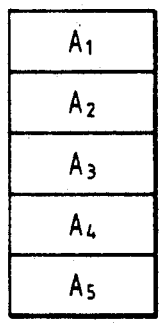 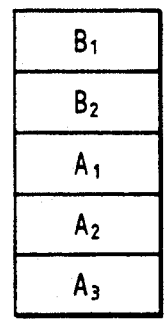 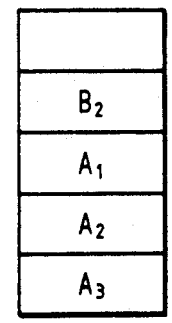 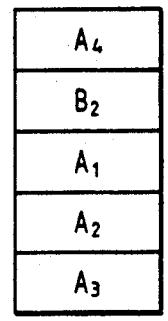

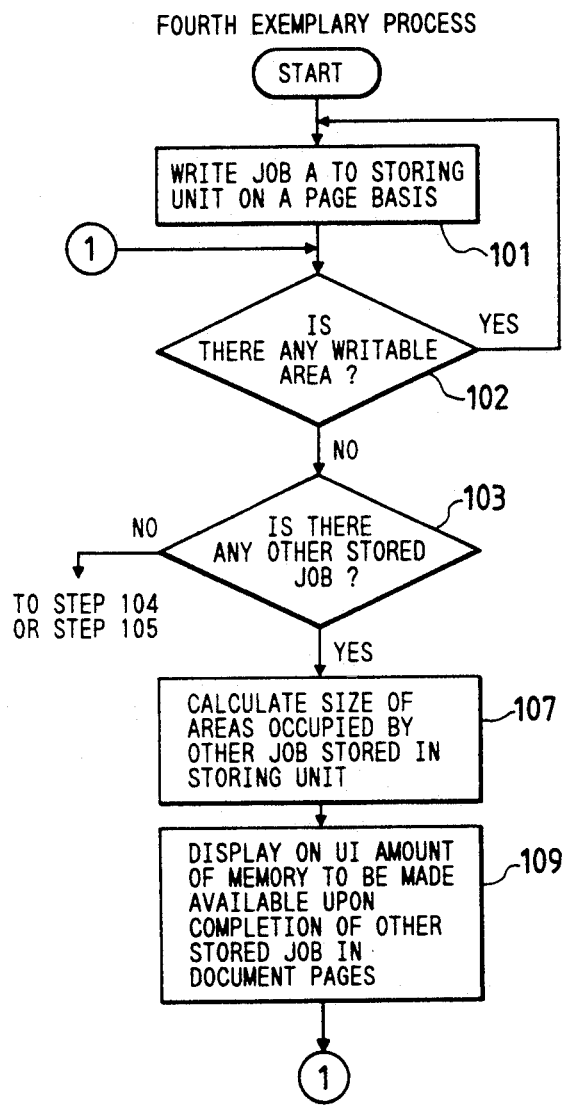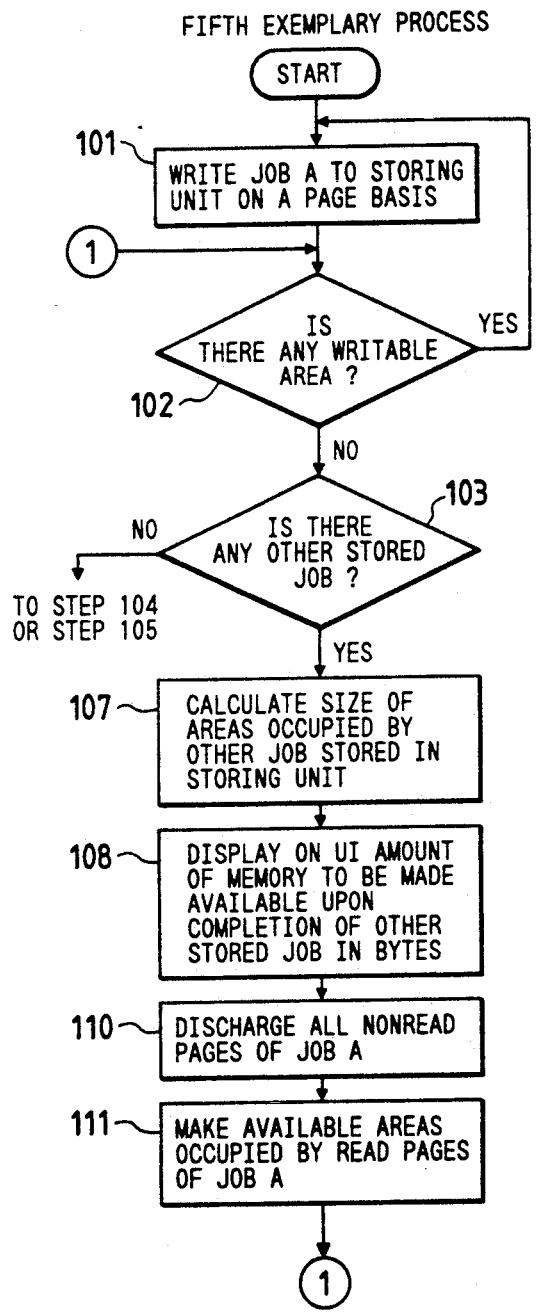

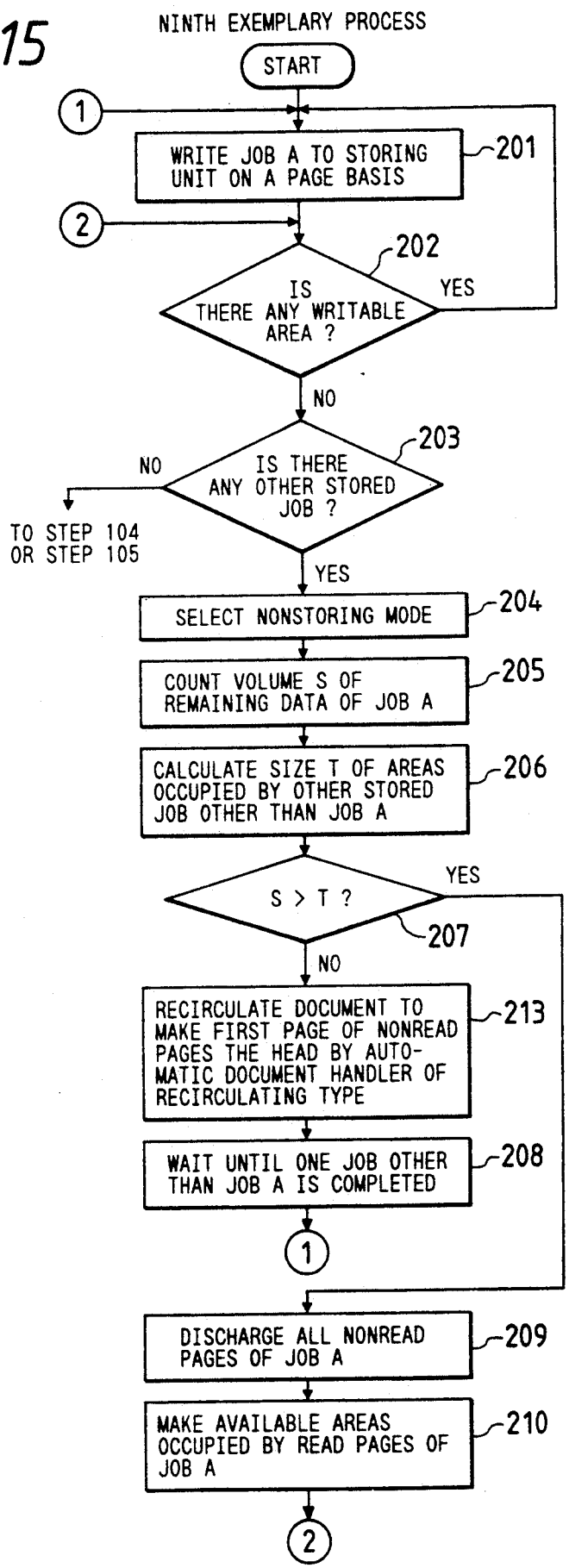

METHOD OF CONTROLLING DIGITAL COPYING MACHINE

BACKGROUND OF THE INVENTION

1. Field of the Invention

This invention relates to a method and apparatus for controlling a digital copying machine in which an image is formed on a sheet of paper based on image data obtained from an image input unit.

2. Discussion of the Related Art

Conventional electrophotographic copying machines use a lens to focus light reflected from a document onto a photoreceptor and expose the photoreceptor to form a latent electrostatic image. The latent electrostatic image is then developed and formed into a toner image. The toner image is then transferred onto a sheet of paper to produce a copy of an original document.

These so-called "light-lens" electrophotographic copying machines are known in the art. However, a new type of electrophotographic copying machine, generally referred to as a "digital copying machine," is now attracting attention in the copying machine field. A digital copying machine copies a document image using a sensor-based image input unit to obtain image signals, converts the obtained image signals into digital signals, processes the digitized image signals, and forms an image corresponding to the document image on a sheet of paper using an image output unit such as a laser printer.

In general, the digital copying machine processes image signals from the image input unit in almost real time and feeds the processed signals to the image output unit. Alternatively, digitized image signals are stored in memory on a page basis, and supplied to the image output unit after processing.

To increase copying efficiency, the digital copying machine is often used in combination with an automatic document handler (ADF) or a recirculating automatic document handler (RDH). An example will now be considered in which a digital copying machine equipped with an ADF prepares and sorts n copies of a document consisting of m pages. Copying with an ordinary ADF which is not capable of recirculating documents requires that n copies of each page be successively produced and that the produced copies be sequentially discharged into n bins of a sorter. This operation must be repeated m times to complete n sets of copies having m pages. Copying with an RDH allows the required number of copies to be produced and sorted without using a sorter. That is, m pages of the document are sequentially copied one time and the processed copies are discharged into a discharge tray. Thereafter, the document is recirculated as many times as are required to complete n copies. However, the RDH passes the document through belts and rollers many times, and this repeated handling is liable to damage document pages.

To overcome this problem, a copying apparatus has been proposed in which the image data of the respective document pages are stored in a storing unit and that the stored image data be read in a desired sequence to produce desired copies. For example, all the images in m document pages are read by the image input unit to obtain resulting image signals. The obtained image signals are then converted into corresponding digital signals and stored in a hard disk unit. If the stored digital signals are repeatedly read from the hard disk unit and output in the order of first, second, third, . . . mth page, first, second, third, . . . mth page, and so on, n copies can be prepared and sorted without using a sorter and without handling the original document more than once.

Furthermore, the image output unit of the digital copying machine may be used as a printer for a print job from another image data source, e.g., a work station. The term "job" herein used is intended to mean a block of image data subjected to similar processing. This arrangement requires that the digital copying machine be connected to the other data source through a communication line and that image data from the other image data source be applied to the image output unit during a period in which a document is being read from the image input unit and stored in the storing unit. Upon printing of the job from the other image data source, the stored image data of the document can be read from the storing unit and applied to the image output unit to produce copies. Accordingly, the shared use of the image output unit reduces the need for units which perform similar functions and makes efficient use of the image output unit.

Occasionally, no writable area is available in the storing unit when a larger volume of data is applied from the image input unit to the storing unit than is taken from the storing unit by the image output unit. In such circumstances, a conventional copier unit will cancel the job, and as a result, the unit must wait until the volume of the data stored in the storing unit is reduced before again reading the document.

SUMMARY OF THE INVENTION

The present invention has been made in view of the above circumstances and has an object of providing an improved method and apparatus for controlling a digital copying machine which allows copying to be efficiently continued even when there is no writable area in the storing unit.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, for a digital copying machine comprising an image input unit for reading a document and obtaining corresponding image data, an image storage unit for temporarily storing the image data, and an image output unit, a method of controlling the digital copying machine comprises the steps of: at the time image data is being stored determining whether or not there is any writable area; if there is no writable area, temporarily suspending reading of the job; and resuming reading of the job when an area which has been occupied by a previously stored job is made available upon completion of printing of that stored job by the image output unit.

BRIEF DESCRIPTION OF THE DRAWINGS

FIG. 5 is a flow chart depicting a first exemplary process in the digital copying machine shown in FIG. 1;

FIGS. 6(a-e) comprises schematic views illustrating the image data stored in the storing unit;

FIGS. 7 to 10 are flow charts respectively depicting exemplary processes performed by the circuit shown in FIG. 4;

FIGS. 12 to 15 are flow charts respectively depicting exemplary processes performed by the circuit shown in FIG. 11.

DETAILED DESCRIPTION OF THE PREFERRED EMBODIMENTS

Figure 1:
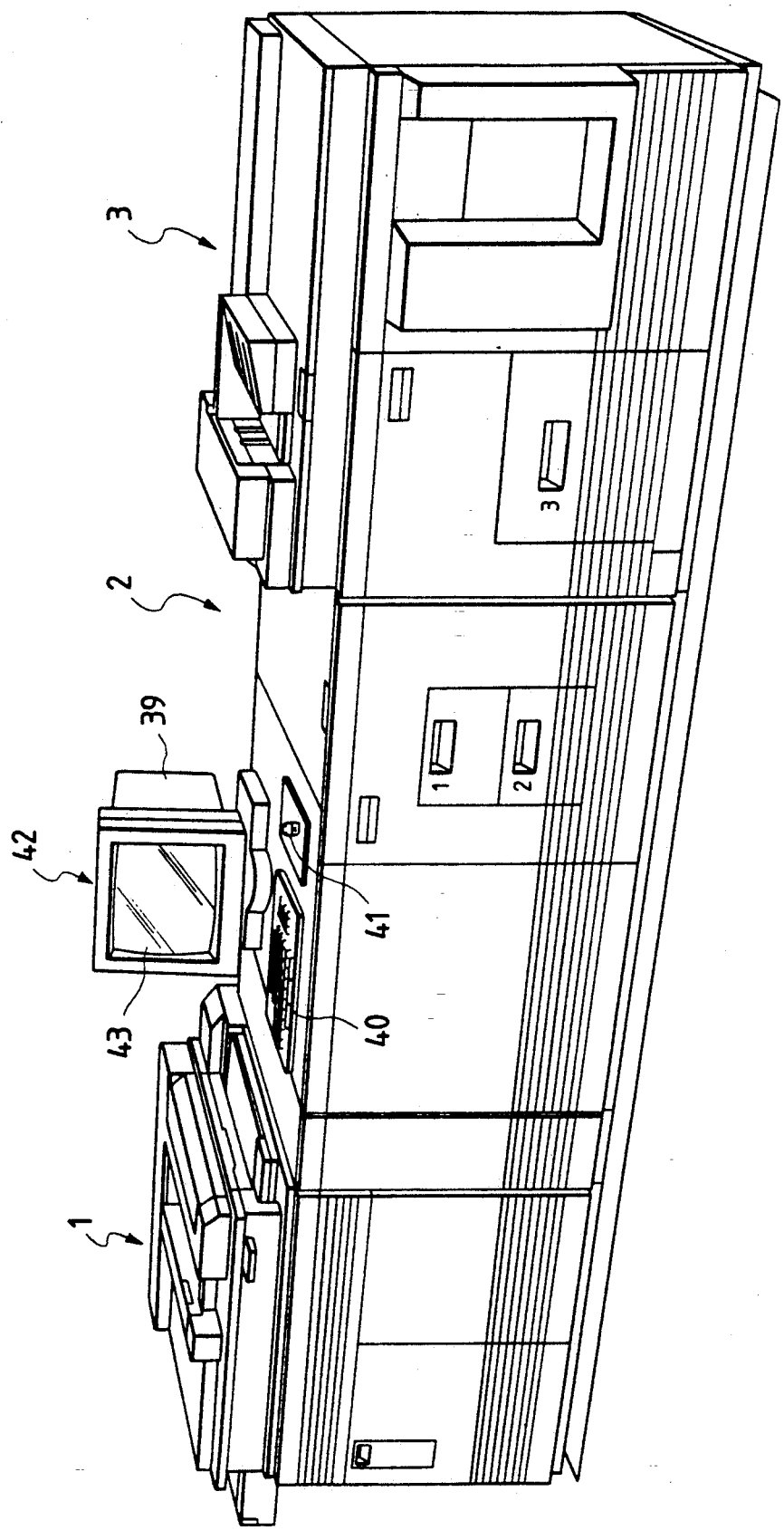
FIG. 1 is a general perspective view depicting a digital copying machine to which the teachings of the present invention are applied.

FIG. 1 shows an embodiment of a digital copying machine according to the present invention. The machine roughly comprises an image reading section 1 for reading a document, a control section 2 for controlling the machine, and a printing section 3 for producing copies on sheets of paper.

Figure 2:
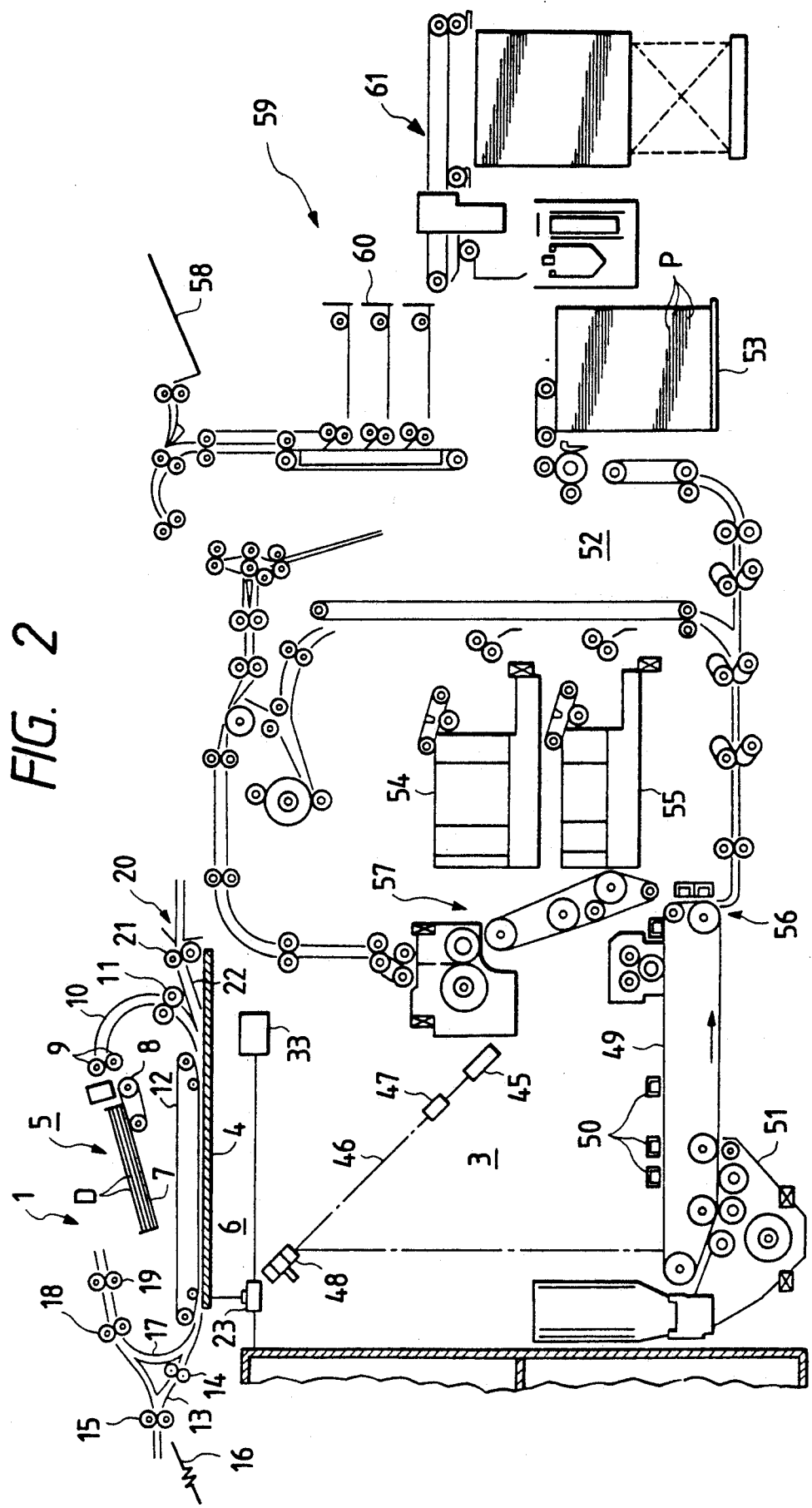
FIG. 2 is a schematic front view illustrating the internal structure of the digital copying machine shown in FIG. 1.

FIG. 2 schematically shows the internal structure of the digital copying machine shown in FIG. 1. Reading section 1 comprises an automatic document handler 5 for automatically handling document D on transparent platen 4, and an image input unit 6 for reading images of document D placed on platen 4 by a scanning process.

Automatic document handler 5 allows, for example, three different modes to be selected: a normal automatic document handling mode (ADF mode), a recirculating automatic handling mode (RDH mode), and a semi-automatic document handling mode (SADH mode). In the ADF mode, document D is placed faceup in document tray 7 and each document page is fed by vacuum feed belt 8 beginning with the lowermost page. Document D is transferred to a predetermined position on platen 4 through document feed roller 9, bent chute 10, document feed roller 11, and document feed belt 12. After bein copied, document D is fed to chute 13 by document feed belt 12 and discharged into catch tray 16 by document feed rollers 14 and 15. In the RDH mode, the copied document D is, instead of being directly discharged into catch tray 16, returned back to document tray 7 by document feed rollers 18 and 19 by passing through document return chute 17. In the SADH mode, document D is inserted from document entry slot 20, fed between document feed belt 12 and platen 4, and transferred to a predetermined position by document feed belt 12.

In image input unit 6 of FIG. 2, document scanner 23 is arranged at the lower portion of platen 4. Document scanner 23 is driven by scanning means 33 and performs reading of the images of document D on a page basis by reciprocating along the bottom surface of platen 4. Image sensor 32 produces an image signal corresponding to the image of document D.

Figure 3:
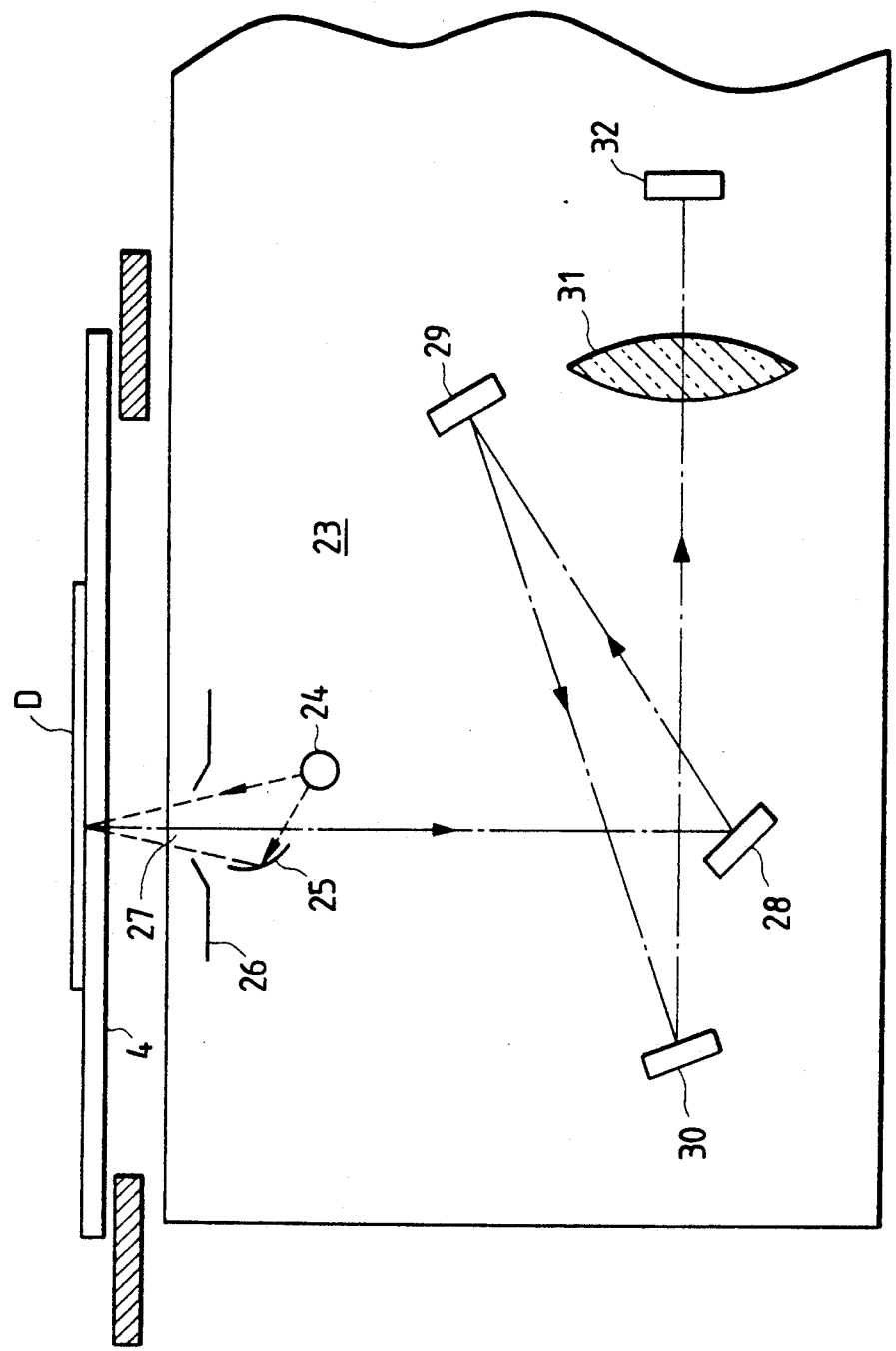
FIG. 3 is a schematic sectional view showing certain construction details of the document scanner for the digital copying machine shown in FIG. 1.

FIG. 3 is a schematic sectional view showing certain construction details of the document scanner 23. According to FIG. 3, document scanner 23 is constituted by exposing lamp 24, reflecting plate 25, slit plate 26, and mirrors 28, 29, 30, lens 31 and line image sensor 32. Light from exposing lamp 24 is formed to document D by directly passing through slit 27 on slit plate 26 or by being reflected by reflecting plate 25. The directed light from document D is directed by mirrors 28, 29, and 30, and focused on line image sensor 32 through lens 31.

Figure 4:
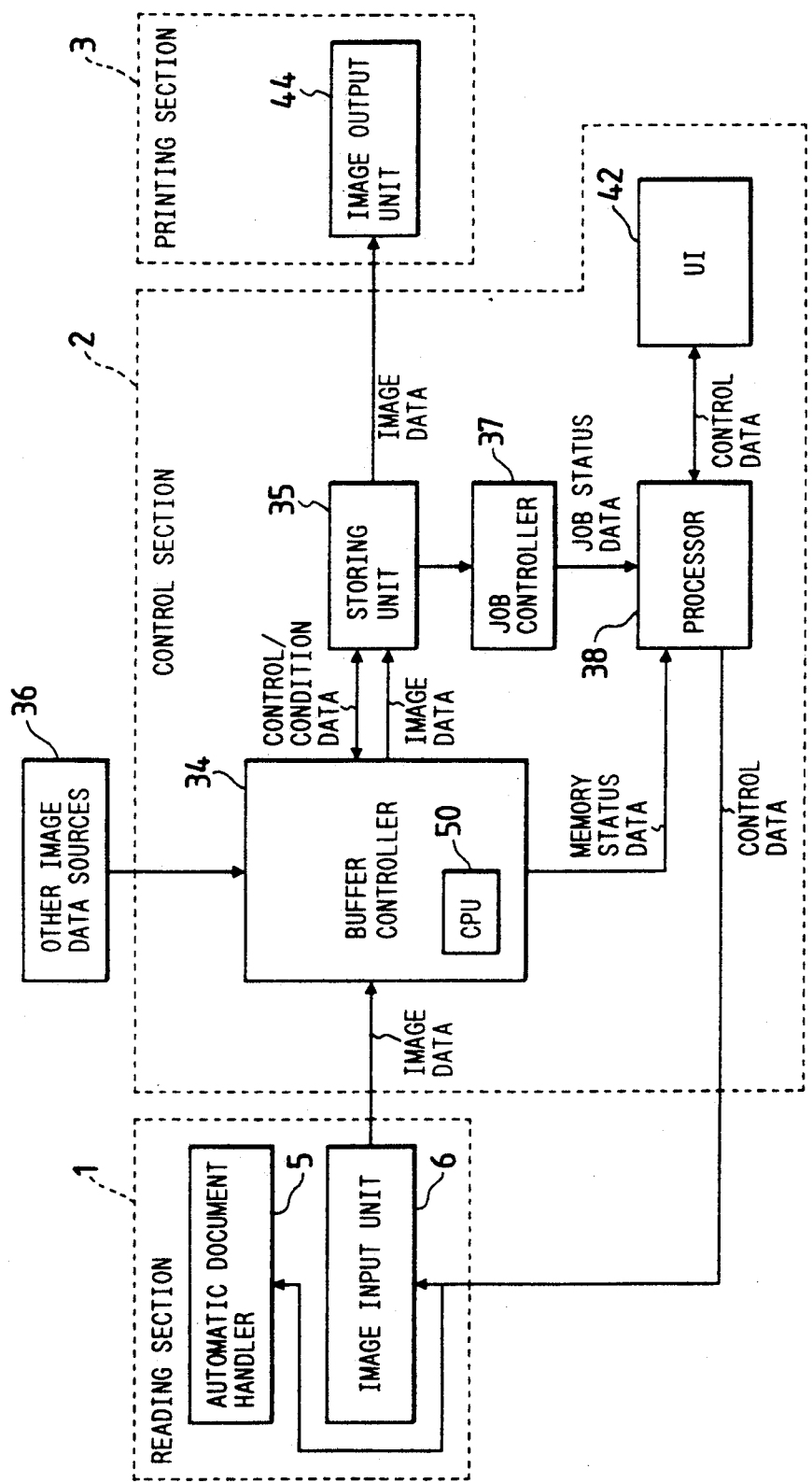
FIG. 4 is a block diagram showing the digital copying machine shown in FIG. 1 wherein no image compression is performed on image data.

FIG. 4 is a block diagram of the digital copying machine shown in FIG. 1. Image signals from image sensor 32 of FIG. 3 are digitized by an image processing circuit (not shown), arranged at image input unit 6 and applied to control section 2 after being subjected to predetermined image processing.

The image data from image input unit 6 is written to and stored in storing unit 35 on a page basis through buffer controller 34. Likewise, image data from other image data sources 36, such as a work station, a computer, or a facsimile machine, are applied to buffer controller 34 through a communication line and written to storing unit 35 by buffer controller 34. Buffer controller 34 checks the quantity of available memory remaining in storing unit 35. Job controller 37 contains the number and type of jobs stored in storing unit 35.

The storing unit 35 comprises, for example, a hard disk unit which consists of several magnetic disks and a read/write mechanism. The data memory capacity of the hard disk unit can be from several tens to several hundreds of kilobytes. The memory of the hard disk unit is divided into multiple memory areas of several hundreds bytes each. Each area is subjected to "formatting" such as setting file attributes, and allocating image data areas and management data areas. During formatting memory areas which are not usable due to disk defects, for example, are determined and their location recorded in a data management file as "bad memory sectors." The control CPU 50 of buffer controller 34 in control section 2 has memory allocated for storing the statuses and addresses of these memory areas, and a program for managing the memory areas on a page and job basis.

In the present embodiment, image reading is performed according to the following process. Image date produced by reading section 1 or image data which has been obtained by developing into a bit map code data sent from another image data source 36 is compressed on a page basis by a compressor using any suitable compression algorithm, e.g., an adaptive prediction coding algorithm, and temporarily stored in a page memory. In addition, the data size of a page is input from the data source to buffer controller 34 through a communication line (not shown) as a number of bits per scan line and a number of lines, together with the job attributes such as a number of pages, resolution, and similar printing and finishing instruction data. The buffer controller 34 provides these values to the compressor as a program. The image data compressed by the compressor is sequentially stored in empty areas of the page memory. Upon completion of compressing the programed amount of data, the compressor sends an end-of-compression signal to the control CPU 50 of buffer controller 34. In response to this signal, the control CPU calculates the data amount after the compression and on this basis calculates the start and stop addresses of the corresponding compressed image data in the page memory.

The control CPU 50, while checking the status flag, retrieves the location of empty sectors on the hard disk unit which can store the compressed data of this page, and upon location of a plurality of areas sufficient to store one page of image data, the control CPU 50 writes the compressed image data in these areas. Since the page of image data is stored in disperse areas on the hard disk unit, the control CPU retains and manages address data required to reconstruct the image data page, as well as the total amount of memory areas used in the above. The control CPU also retains and manages the address date required to reconstruct a document consisting of multiple image data pages, as well as the total amount of memory areas used to store the document.

The control CPU 50 also manages the total amount of memory areas which can be allocated to a image data storing process by checking the status flags of the areas and accumulating the number of remaining writable areas. Therefore, after compressing a page of image data and calculating the amount of data following compression on the basis of the resulting start and stop addresses of the corresponding compressed image data, the control CPU determines whether sufficient areas remain for storing the page of image data. This determination is made by comparing the above data amount with the total remaining writable areas. If storage is possible, the control CPU 50 causes the hard disk unit to store the new image data as described above. If storage is not possible, the control CPU temporarily suspends the storing operation.

The stored image data may be read for purposes of printing once or a plurality of times. Upon completion of the printing operation, as defined by the operator, buffer controller 34 clears the status flags of areas used to store the image data of job just finished printing, and thereby making available these memory areas. If a suspended job is present at this time due to an unavailability of writable areas, storing of the suspended job can be resumed.

Management of the hard disk may be performed in the following simplified manner. The available hard disk memory is divided into multiple areas of, for example, 256 bytes. Writing and reading operations are managed for each of individual area. That is, each area has a status flag indicating whether data can be written to the area. The state of each status flag is held by a table provided in buffer controller 34. When data has been written to a certain area, the status flag of that area is set to "not writable," and when the data is read from that area, the flag is set to "writable."

During a writing operation, the CPU refers to the table to locate "writable areas." Once an area is selected and data is written into the area the corresponding status flag is changed to "not writable." During a reading operation, the status flag is changed to "writable" upon reading the data from the area. An external control signal may be applied to forcibly set the an area flag to "writable," and thereby to make the area available.

Memory status data indicating writable areas from buffer controller 34 and the job status data indicating the number of jobs from job controller 37 are applied to processor 38. Processor 38, in response to these data, controls both automatic document handler 5 and image input unit 6 of reading section 1.

Processor 38 is connected to a user interface (UI) 42 such as display unit 39 capable of displaying on a pixel basis, keyboard 40, and mouse 41 as shown in FIG. 1. UI 42 displays operator instructions to processor 38 and general operating conditions of the digital copying machine. Display unit 39 is equipped with a touchscreen 43 which allows, in addition to operation by keyboard 40 or mouse 41, a desired instruction to be input by touching a predetermined icon displayed on the screen by a finger.

The image data within storing unit 35 is synchronously applied to image output unit 44 at printing section 3 of FIG. 4. Image output unit 44 is, for example, a raster output scanner (ROS) of the laser printer type utilizing electrophotographic technology.

As shown in FIG. 2, beam 46 from laser 45 is modulated in accordance with the image data by acoustooptic modulator 47 and made to scan (traverse) beltlike photoreceptor 49 by the mirrored facets of a rotating polygon 66. Photoreceptor 49 is uniformly charged by a plurality of corotrons 50 and latent electrostatic image is formed thereon through exposure to the modulated laser beam. These latent electrostatic image is developed by developer 51 and, as a result, a toner image is formed on photoreceptor 49. This toner image on photoreceptor 49 is then transferred at transfer section 56 while positioned on recording sheet P synchronously brought forward from either main sheet feed tray 53 or auxiliary sheet feed trays 54 and 55 of sheet feeder 52. Recording sheet P having the image transferred thereon is forwarded to fusing unit 57 where the toner image is fused, and the resulting final copy is output to either discharge tray 58 or finisher 59. Finisher 59 includes a stitcher 60 for stitching or stapling the copies together as a finished document copy and a thermal binder 61 for adhesively binding the copies into finished a document copy.

As an example of operation of the above described digital copying machine, using an automatic document handler 5 in the ADF mode, the following exemplary process will be described with reference to the flow chart shown in FIG. 5. When an instruction to start copying is given by operating UI 50 such as keyboard 52, mouse 53, or touchscreen 54 shown in FIG. 1 or 4, processor 38 applies control data to the automatic document handler 5. Document D resting faceup on document tray 7 is fed on a sheet basis by vacuum feed belt 8 to a predetermined position on platen 4 through document feed roller 9, bent chute 10, document feed roller 11, and document feed belt 12. When document D has been positioned, control data is applied to the image input unit 6. Document scanner 23 is moved along the bottom surface of platen 4 so that the image of document D will be read to obtain the resulting image data. The image data are written to storing unit 35 on a page basis through buffer controller 34 (Step 101).

The term "job" herein used is intended to mean a block of image data subjected to similar processing. For example, a series of image data from image input unit 6 is called job A. If a second series of image data from input unit 6 is subjected to different processing from that applied to job A, the second series of image data will be called job B. If image data from another image data sources 36 is to be processed, such image data will be called job C. A job may consist of a plurality of pages or a single page.

When writing image data to the storing unit 35 buffer controller 34 will locate writable areas (Step 102). The location of writable areas can be performed by referring to the table indicating the states of the status flags as described above. If sufficient writable areas to store a page of job A are present, processor 38 returns to Step 101 and causes automatic document handler 5 and image input unit 6 to read a successive page of job A.

The image data thus obtained is then written to storing unit 35 on a page basis, and the read page of job A is discharged into catch tray 16. As long as there are sufficient writable areas in storing unit 35, Steps 101 and 102 are continued in a loop until the image data of each page $A_1, A_2, \ldots$ of job A are sequentially written to areas as shown in FIG. 6(a). The flag of a respective area written into is changed to "not writable" and the table is modified accordingly.

Although the image data of each page $A_1, A_2, \ldots$ is stored in the orderly form shown in FIG. 6(a) for purposes of illustration, each data is actually allotted to whichever writable area is located. While the number of writable areas will decrease with increasing volume of writing, the presence of any writable area is located by buffer controller 34 and the writable status is indicated to processor 38. When there is no writable area remaining, as shown in FIG. 6(b), it is determined whether or not there is any other job stored in memory (Step 103). If there is no other job stored in memory, as shown in FIG. 6(b), the processing of job A will be stopped (Step 104). However, if there is a stored job B, as shown in FIG. 6(c), consisting of a plurality of pages $B_1$ and $B_2$, processor 38 returns to Step 102.

In the storing unit 35, the writing of image data from image input unit 6 and the reading of image data to image output unit 44 are performed concurrently in a time sharing manner. A rule of "first-write first-read" is basically applied to any job, whereby the area from which data has been read is made writable to for another job. For example, in the case of the electronic RDH mode, upon completion of the final reading required for printing of multiple copies the areas become writable. That is, the status flag is changed to "writable" and the table is modified accordingly once the data has been read from an area. For example, upon the final reading of image data for page $B_1$ of a preceding job B, the area having been occupied by this image data will be designated as writable and thereby made available. That is, as shown in FIG. 6(d), a writable area will be provided. Thus, a successive page $A_4$ of job A can be written as shown in FIG. 6(e) as the writable area is available.

As described above if there is no writable area for writing a job, it is determined whether or not there is any other job stored in storing unit 35. If there is, processor 38 waits until the area occupied by such stored job is made available before resuming the writing of the suspended job. Thus, in contrast to conventional copying machines that interrupts the job processing, the present invention dispenses with the necessity of re-reading of the document, and thereby improves copying efficiency.

Figure 7:
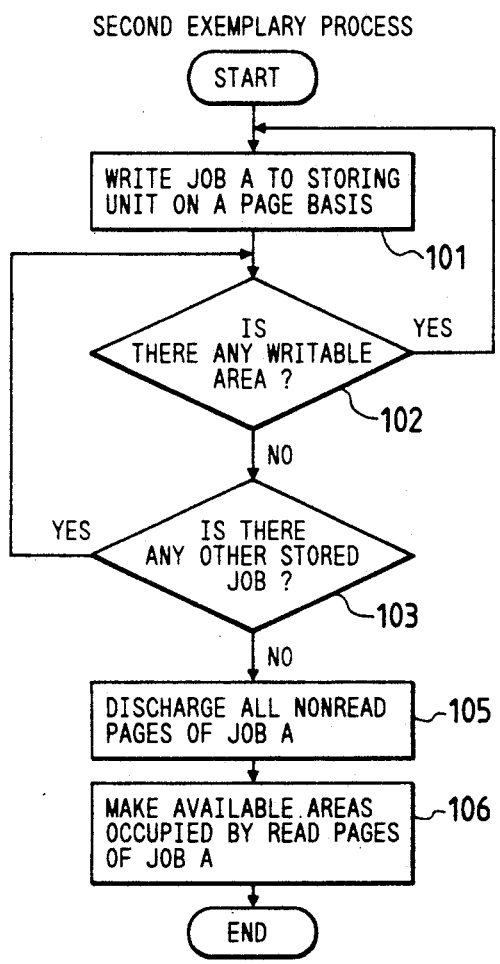

The operation of a second exemplary process will be described with reference to the flow chart shown in FIG. 7. Like step numbers designate corresponding processing in FIG. 5 and the descriptions thereof will be omitted where applicable. Referring to the flow chart shown in FIG. 7, if pages $A_1$ to $A_5$ of job A are stored in storing unit 35 as shown in FIG. 6(b), and if it is determined that there is not another stored job (Step 103), the pages of job A which have not yet been read will be discharged (Step 105). For example, if the document consists of pages $A_1$ to $A_7$, pages $A_6$ and $A_7$ are discharged into catch tray 16 by automatic document handler 5. Furthermore, the areas which have been occupied by the stored pages of job A will be made available (Step 106). When a job can no longer be written, this second exemplary process not only stops the job as in the case of the first exemplary process but also discharges the document and frees the area in storing unit 35. Thus, the copying operation can be readily resumed by merely returning the discharged pages of the document to document tray 7 at automatic document handler 5. This second exemplary process may also be arranged such that processor 38 will go to Step 105 only after a cancel instruction has been received from UI 42 instead of automatically going from Step 103 to Step 105.

Figure 8:
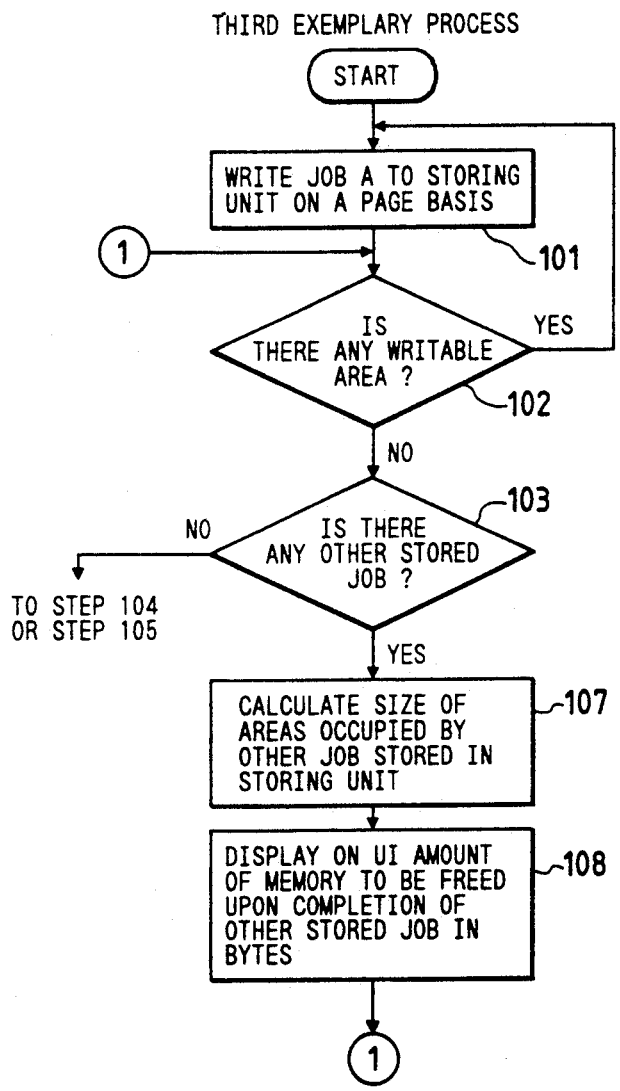

The operation of a third exemplary process will now be described with reference to the flow chart shown in FIG. 8. Referring to FIG. 8, if it is determined that there is no other stored job in storing unit 35 in Step 103, processor 38 either stops the job by advancing to Step 104 shown in the flow chart of FIG. 5 or discharges the nonread pages of the document and makes available the area(s) in storing unit 35 by advancing to Steps 105 and 106 in the flow chart of FIG. 7. If there is any other stored job, processor 38 calculates the size of the area occupied by such other stored job (Step 107) and displays the amount of memory in bytes which would be made available upon completion of the other stored job on the display unit 39 of UI 42 (Step 108). Thereafter, processor 38 returns to Step 102. Accordingly, as long as there remains a possibility of job writing, the user is informed as to how much a job is expected to be written. This information enables the user to resume the processing of a suspended job, in a timely manner and to manage the execution of other copying operations. For example, finishing of the job under processing may be accelerated or skipped altogether in order to resume the suspended job. Moreover, it may be possible to add another finishing to the job under processing. If the finishing to be added is a process which can be performed independently of, i.e., in parallel with the printing, the finishing can be added without delaying the resumption of the suspended job.

The operation of a fourth exemplary process will be described with reference to the flow chart shown in FIG. 9, which is very similar to the flow chart shown in FIG. 8. While in the third exemplary processing shown in FIG. 8, the amount of memory which would be made available upon end of the other stored job is directly displayed in bytes in Step 108, in the fourth exemplary processing shown in FIG. 9, the amount of memory is displayed in terms of a number of document pages (Step 109). That is, assuming image data is not compressed, the volume of data corresponding to a document page is determined by the resolution and size of the document. Thus, the number of document pages can be calculated by dividing the amount of memory by the volume of data per page.

The operation of a fifth exemplary process will be described with reference to the flow chart shown in FIG. 10. The fifth exemplary process involves an addition of two steps following Step 108 of the third exemplary process shown in FIG. 8. The two added steps are discharging the pages of job A which have not yet been read (Step 110) and making available the areas occupied by the stored pages of job A (Step 111), such as where previously described in the second exemplary process.

The first through fifth exemplary processes described above refer to the operation of a digital copying machine in which image data is not compressed. The subsequently described exemplary processes refer to a digital copying machine in which image data is compressed and expanded, as shown in the block diagram of FIG. 11. Like reference numerals designate corresponding parts and components in the block diagram shown in FIG. 4.

Figure 11:
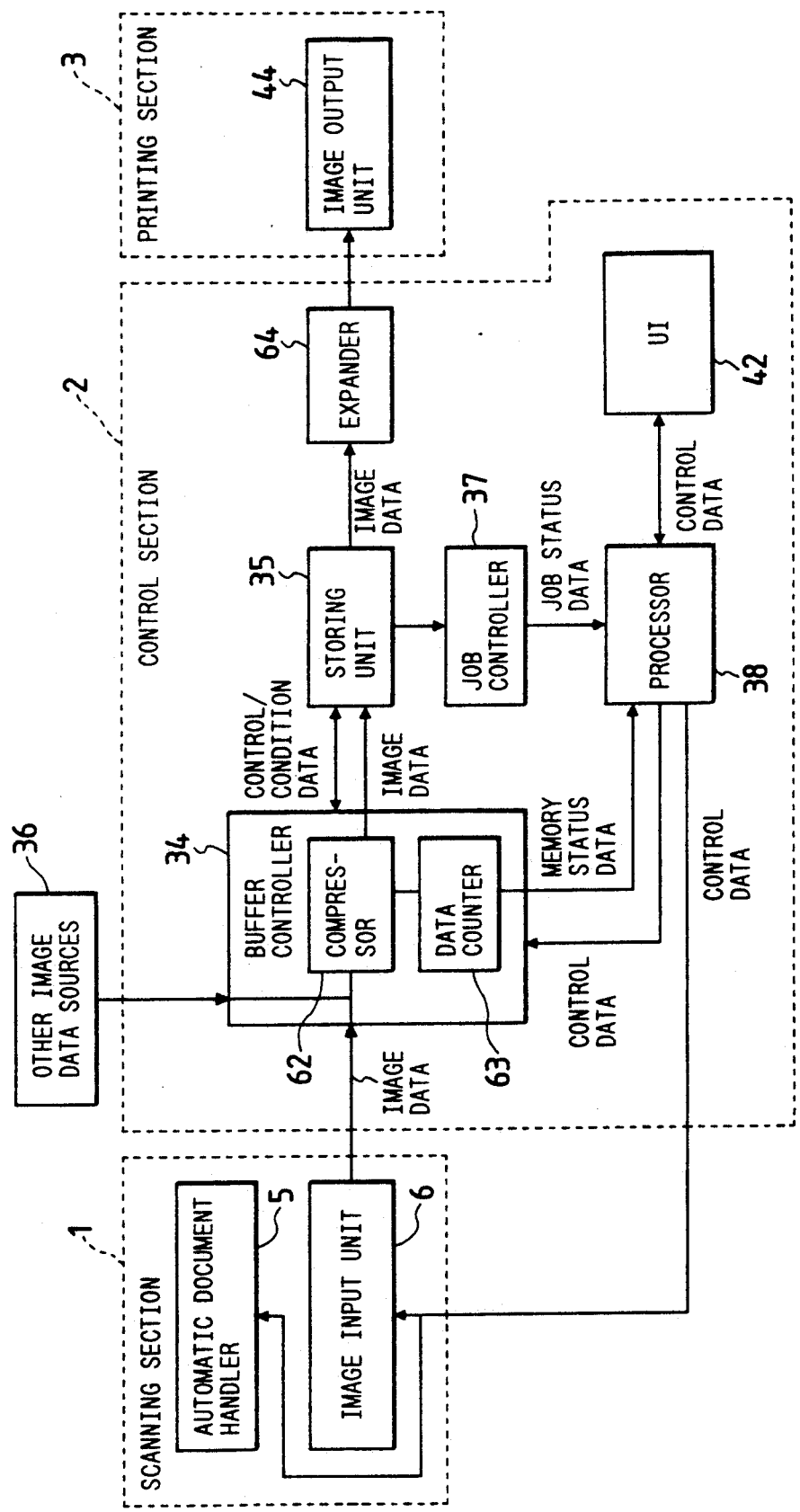
FIG. 11 is a block diagram showing the digital copying machine shown in FIG. 1 wherein image compressor is performed on image data.

The copying machine shown in FIG. 11 includes compressor 62 for compressing image data from image input unit and data counter 63 for counting the size of the compressed image data within buffer controller 34. Buffer controller 34 selects an image data storing mode and a nonstoring mode in storing unit 35 based on an instruction from processor 38. The compressed image data read from storing unit 35 is recovered to the original image data by expander 64 and then applied to image output unit 44.

Figure 12:
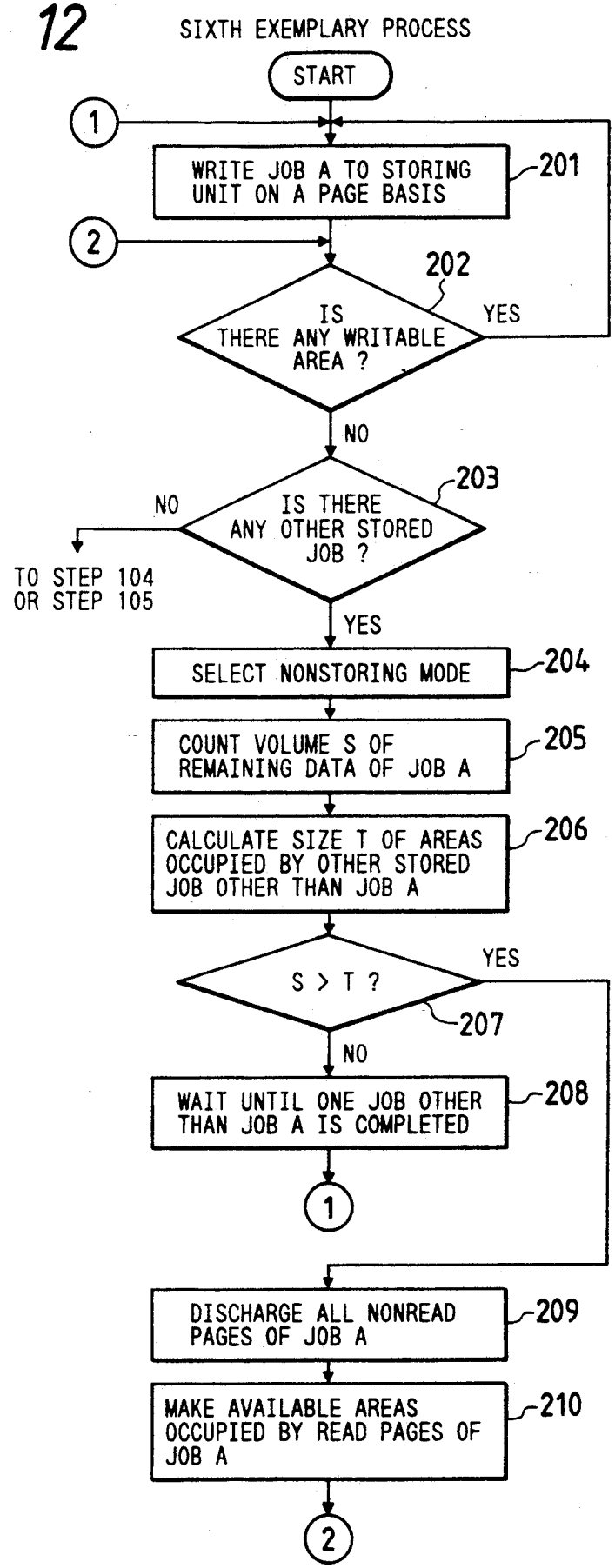

A sixth exemplary process is shown in FIG. 12. Image data from image input unit 6 is compressed by compressor 62 and written to storing unit 35 as job A on a page basis (Step 201). The volume of data per page varies depending on the page. The volume of data after compression is counted by data counter 63. If there are sufficient writable areas to the page of image data in storing unit 35 (Step 202), processor 38 returns to Step 201 and causes automatic document handler 5 and image input unit 6 to read a successive page. Additional successive pages of image data are accordingly stored in storing unit 35.

If, however, no writable areas are present in storing unit 35, it is determined whether or not there is any other job stored in storing unit 35 (Step 203). If no other job is stored, the processing of job A is suspended (see Step 104 in FIG. 5) and the areas in storing unit 35 will be made writable once a previous job has been completed (see Steps 105 and 106 in FIG. 7). If another job is stored, buffer controller 34 selects, in response to an instruction from processor 38, the nonstoring mode so that no image data will be stored in storing unit 35 (Step 204). Thereafter, the remaining document pages are read by automatic document handler 5 and image input unit 6, the read image data is compressed by compressor 62, and the volume S of remaining data after compression of job A is counted by data counter 63 (Step 205). For example, if the document consists of pages $A_1$ to $A_5$ and only pages $A_1$ to $A_3$ are stored in compressed form, the compressed image data of pages $A_4$ and $A_5$ are represented by the volume of image data, S. Reading and compression of the pages $A_4$ and $A_5$ are performed only to calculate the volume of remaining data S, and the compressed image data will not be stored in storing unit 35.

After S has been calculated, the size T of the area(s) occupied by a job or jobs other than job A stored in storing unit 35 is calculated (Step 206). If the volume S of data to be stored is greater than the size T of area(s) to be made available (Step 207), processing can no longer be continued. Therefore, the pages of job A which have not yet been read are discharged (Step 209) and then the areas occupied by the stored pages of job A are made available (Step 210). On the other hand, if the volume of data S is less than or equal to the size T, processor 38 waits until a job other than job A is completed (Step 208) and returns to Step 201. The sixth exemplary processing can adaptively control storing of the image data in storing unit 35 even in compressed form by automatically determining whether or not the remaining document pages can continuously be read.

Figure 13:
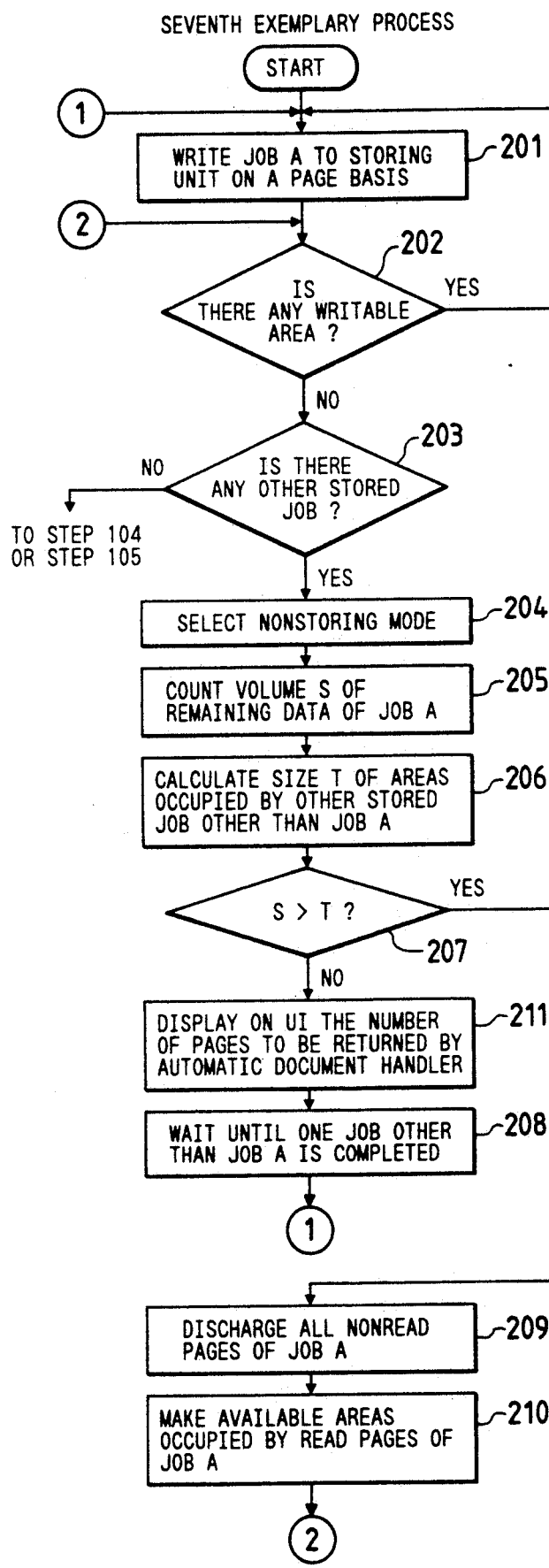

The operation of a seventh exemplary process shown in FIG. 13 inserts a step between Step 207 and Step 208 in the sixth exemplary process shown in FIG. 12. Step 211 causes the number of pages to be discharged, or returned, by automatic document handler 5 to be displayed on the UI 42. For example, if the document consists of pages $A_1$ to $A_5$ and only pages $A_1$ to $A_3$ are stored, a message indicating that pages $A_4$ and $A_5$ will be returned is displayed. In the seventh exemplary process, the number of pages is counted by a document counter every time a page is handled by automatic document handler 5. The count data is applied to processor 38, such that, the number of pages to be returned can be calculated by subtracting the number of stored pages from the total pages of the document. Display on UI 42 of the number document pages to be returned helps the user avoid confusion and mistakes.

Figure 14:
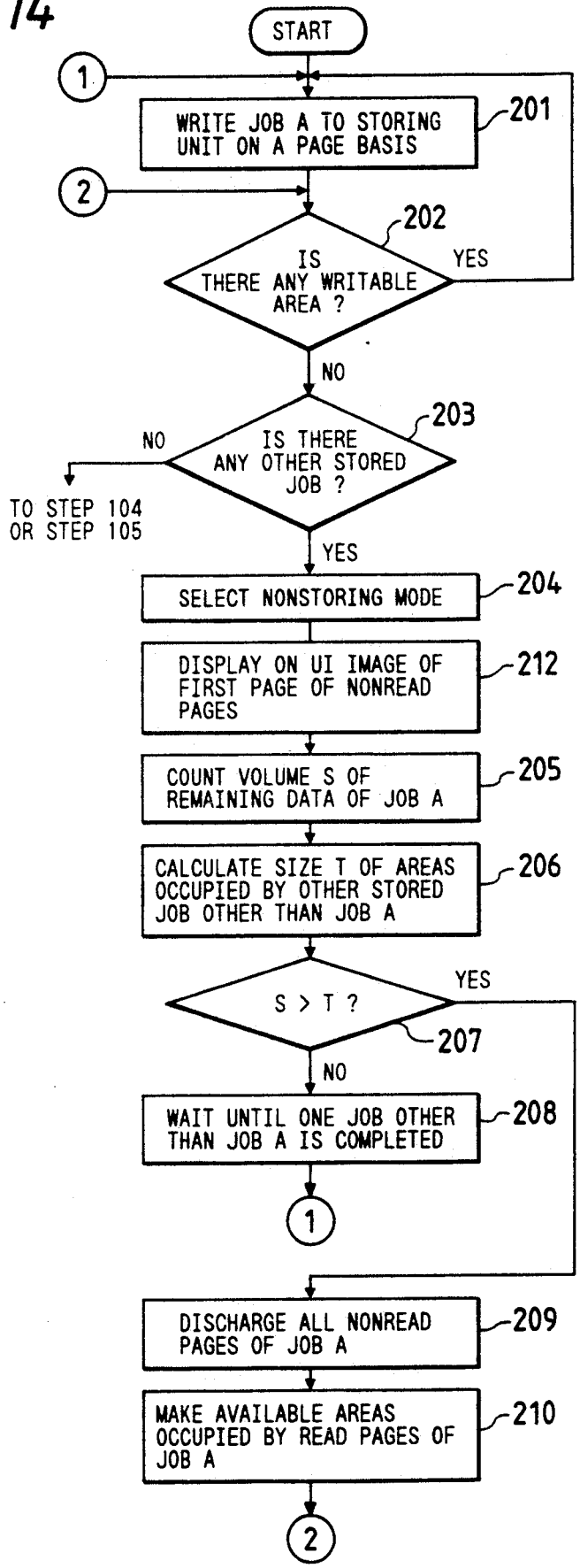

An eighth exemplary process shown in FIG. 14 has a step inserted between Step 204 and Step 205 of the sixth exemplary process shown in FIG. 12. Step 212 causes the image of the first document page which has not yet been stored to be displayed on the UI 42. Such direct display of the page's image enables the user to locate the document page to be returned at a glance, thereby simplifying document return process.

Although the descriptions of all the above exemplary processes refer to a case in which the automatic document handler 5 is used in the ADF mode, these processes may also be applied to the RDH mode in which each document page read is automatically returned to its original position.

A ninth exemplary process in which automatic document handler 5 is used in the RDH mode and the image data is compressed and expanded is shown in FIG. 15. The ninth exemplary process is almost identical with the seventh exemplary process shown in FIG. 13 except that in the former process, the document pages are recirculated until the first page of the document which has not been stored is placed in a position where this page will be next read when reading is resumed. In contrast, the latter process displays on UI 42 the number of pages to be returned by automatic document handler 5 and using this information the operator then manipulates the pages by hand. That is, in the ninth exemplary process, each read document D page on platen 4 (see FIG. 2) is sequentially returned to document tray 7 by document feed rollers 18 and 19 through document return chute 17, and in this way, the document pages are recirculated by the automatic document handler 5 in the RDH mode until the first page that has not been stored in storing unit 35 becomes the next page to be read. For example, if the document consists of pages $A_1$ to $A_5$ and only pages $A_1$ to $A_3$ are stored, the document is recirculated until page $A_4$ is set on the platen 4 of image input unit 6. Thus, the user must no longer stay close to the copying machine and can do other work remote from the copying machine once he has given the instruction to start copying.

As described in the foregoing pages, if there is no writable area in the storing unit during the storage of image data obtained from the image input unit, it is determined whether or not there is any other stored job and the writing operation is resumed upon indication that the area occupied by the other stored job has been made available. Thus, in contrast to conventional copying machines in which the processing of a job is terminated, the present invention dispenses with the requirement of re-reading the document, and thereby improves copying efficiency.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of controlling a digital copying machine in which image data corresponding to a copy job is obtained by reading an image of a document with an image input unit, wherein said image data is temporarily stored in a storing unit and read therefrom to be printed by an image output unit, said method comprising the steps of:
   - at a time when said image data corresponding to the copy job is being stored in said storing unit, judging whether there is available memory area in said storing unit;
   - if there is no available memory area, temporarily suspending reading of said job;
   - resuming reading of said job when memory areas occupied by previously stored jobs become at least partially available upon completion of a portion of said stored jobs by printing on said image output unit; and
   - terminating a current job by discharging all nonread pages of said current job and freeing memory areas occupied by previously read pages of said current job is if there is no available memory area in said storing unit.

2. A method of controlling a digital copying machine in which image data corresponding to a copy job is obtained by reading an image of a document with an image input unit, wherein said image data is temporarily stored in a storing unit and read therefrom to be printed by an image output unit, said method comprising the steps of:
   - at a time when said image data corresponding to the copy job is being stored in said storing unit, judging whether there is available memory area in said storing unit;
   - if there is no available memory area, temporarily suspending reading of said job;
   - resuming reading of said job when memory areas occupied by previously stored jobs become at least partially available upon completion of a portion of said stored jobs by printing on said image output unit;
   - displaying by a display unit a usable storing capacity when a job preceding a current job has been completed;
   - discharging all nonread pages of said current job by an automatic document handler; and
   - freeing memory areas occupied by previously read pages of said current job.

3. A method of controlling a digital copying machine in which image data corresponding to a copy job is obtained by reading an image of a document with an image input unit, wherein said image data is temporarily stored in a storing unit and read therefrom to be printed by an image output unit, said method comprising the steps of:
   - at a time when said image data corresponding to the copy job is being stored in said storing unit, judging whether there is available memory area in said storing unit;
   - if there is no available memory area, temporarily suspending reading of said job;
   - resuming reading of said job when memory areas occupied by previously stored jobs become at least partially available upon completion of a portion of said stored jobs by printing on said image output unit;
   - reading pages of a document to obtain image data for a current job and compressing said obtained image data without storing to said storing unit, and calculating a volume of image data for said current job;
   - comparing said volume of image data with available memory area when a preceding job has been completed;
   - if said available memory area is larger than said calculated volume of image data, resuming reading when memory areas occupied by said stored job become at least partially available upon completion of said job by printing on said image output unit; and
   - if said available memory area is equal to or smaller than said calculated volume of image data, discharging all nonread pages of the current job by an automatic document handler, and freeing areas occupied by previously read pages of said current job.

4. A method of controlling a digital copying machine according to claim 3, further comprising the step of:
   - if said available memory capacity is larger than said calculated volume of image data of the remaining pages of said current job, displaying a number of pages to be returned.

5. A method of controlling a digital copying machine according to claim 3, further comprising the step of:
   - displaying an image of the image data read without being stored in said storing unit on a display unit capable of displaying image data.

6. A method of controlling a digital copying machine according to claim 3, further comprising the steps of:
   - if said available memory area is larger than said calculated volume of image data, recirculating said document in an automatic document handler until a first page not stored in said storing unit becomes a next page to be read by the image input unit; and
   - resuming reading when memory areas occupied by said stored job become at least partially available upon completion of previously stored jobs by printing on said image output unit.

7. A method for controlling a digital copying machine comprising the steps of:
   - automatically reading an image of a document on a job basis to produce image data;
   - compressing said image data to produce compressed image data;
   - storing said compressed image data in a storing means;
   - expanding said compressed image data stored in said storing means to produce expanded image data;
   - outputting said expanded image data as a hard copy of the document;
   - specifying contents of a copy job including a kind of the document, an output order and a number of output copy sets;

computing a partial data amount of a single copy job based on the contents specified in said specifying step;

detecting an available memory area in a storing means based upon a data amount output from an image output means and a data amount stored in the storing means; and determining whether the partial data amount of the copy job is larger than the available memory area in the storing means, and suspending a reading operation of the reading means if affirmative, and resuming the reading operation when the available memory area becomes larger than the partial data amount of the copy job.

8. A method for controlling a digital copying machine comprising the steps of:

specifying contents of a copy job including a kind of document, an output order and a number of output copy sets;

computing a partial data amount of a single copy job based on the contents specified in said specifying step;

detecting an available memory area in a storing means based upon a data amount output from an image output means and a data amount stored in the storing means; and determining whether the partial data amount of the copy job is larger than the available memory area in the storing means, and suspending a reading operation of the reading means if affirmative, and resuming the reading operation when the available memory area becomes larger than the partial data amount of the copy job.

9. An image recording apparatus having means for reading an image of a document to produce image data, means for storing the image data, means for outputting the image data read from the storing means as a hard copy of the document, said apparatus comprising:

means for setting a copy job by specifying contents thereof including a kind of the document and a number of copy sets;

means for computing a total data amount job based on the contents specified by the setting means;

means for detecting an available memory area in the storing means; and means for suspending operation of the reading means when the total data amount is larger than the available memory area.

10. The apparatus according to claim 9, wherein the detecting means detects available memory area based on a data amount output from the image output means.

11. A method for controlling a digital copying machine comprising the steps of:

receiving various kinds of image data on a job basis;

storing said various kinds of image data in a storing means;

specifying contents of a copy job including the kind of the image data, an output order and a number of output copy sets;

computing a partial data amount of a single copy job based on the contents specified in said specifying step;

detecting an available memory area in the storing means based upon a data amount output from an image output means; and determining whether the partial data amount of the copy job is larger than the available memory area in the storing means, and suspending the receiving operation in said receiving step if affirmative, and resuming the receiving operation when the available memory area becomes larger than the partial data amount of the copy job.

12. An image recording apparatus comprising:

means for automatically reading an image of a document on a job basis to produce an image data;

means for compressing the image data produced by the reading means;

means for storing the compressed image data;

means for expanding the image data read from the storing means;

means for outputting the expanded image data as a hard copy of the document;

means for setting a copy job by specifying contents thereof including a kind of the document, an output order and a number of output copy sets;

means for computing a partial data amount of a single copy job on the basis of the job contents specified by the setting means;

means for detecting an available memory amount in the storing means based upon a data amount output from the image output means and a data amount stored in the storing means;

means for judging, before the reading means reads the copy job, whether the partial data amount of the copy job is larger than the available memory amount in the storing means, for suspending a reading operation of the reading means if affirmative, and for causing the reading operation to resume when the available memory amount becomes larger than the partial data amount of the single copy job.

13. The apparatus according to claim 12, wherein the detecting means detects the available memory amount based upon a predetermined compression rate of the compressing means.

14. The apparatus according to claim 12, wherein the detecting means detects the available memory amount from the actual compression rate of the compression means.

15. An image recording apparatus comprising:

means for receiving various kinds of image data on a job basis;

means for storing the image data provided from the receiving means;

means for setting a copy job by specifying contents thereof including the kind of the image data, an output order, and a number of output copy sets;

means for computing a partial data amount of a single copy job on the basis of the job contents specified by the setting means;

means for detecting an available memory amount in the storing means based upon a data amount output from the image output means and a data amount stored in the storing means;

means for judging, before the receiving means receives the image data, whether the partial data amount of the copy job is larger than the available memory amount in the storing means, for suspending a receiving operation of the receiving means if affirmative, and for causing the receiving operation to resume when the available memory amount becomes larger than the partial data amount of the copy job.

16. An image recording apparatus comprising:

means for automatically reading an image of a document on a job basis to produce an image data;

means for storing the image data;

means for outputting the image data read from the storing means as a hard copy of the document;

means for setting a copy job by specifying contents thereof including a kind of the document, an output order and a number of output copy sets;

means for computing a partial data amount of a single copy job on the basis of the job contents specified by the setting means;

means for detecting an available memory amount in the storing means based upon a data amount output from the image output means and a data amount stored in the storing means;

means for judging, before the reading means reads the copy job, whether the partial data amount of the copy job is larger than the available memory amount in the storing means, for suspending a reading operation of the reading means if affirmative, and for causing the reading operation to resume when the available memory amount becomes larger than the partial data amount of the copy job.

* * * * *

UNITED STATES PATENT AND TRADEMARK OFFICE
CERTIFICATE OF CORRECTION

PATENT NO. : 5,253,077
DATED : October 12, 1993
INVENTOR(S) : Ken Hasegawa et al.

It is certified that error appears in the above-indentified patent and that said Letters Patent is hereby corrected as shown below:

Claim 1, column 11, line 35, delete "is" (first occurrence).

Signed and Sealed this

Twentieth Day of September, 1994

Attest:

BRUCE LEHMAN

*Attesting Officer*  *Commissioner of Patents and Trademarks*